June 7, 1927.
C. T. LOUGHREY
PROCESS OF DISTILLING OIL SHALE
Filed May 5, 1921
1,631,637
3 Sheets-Sheet 1
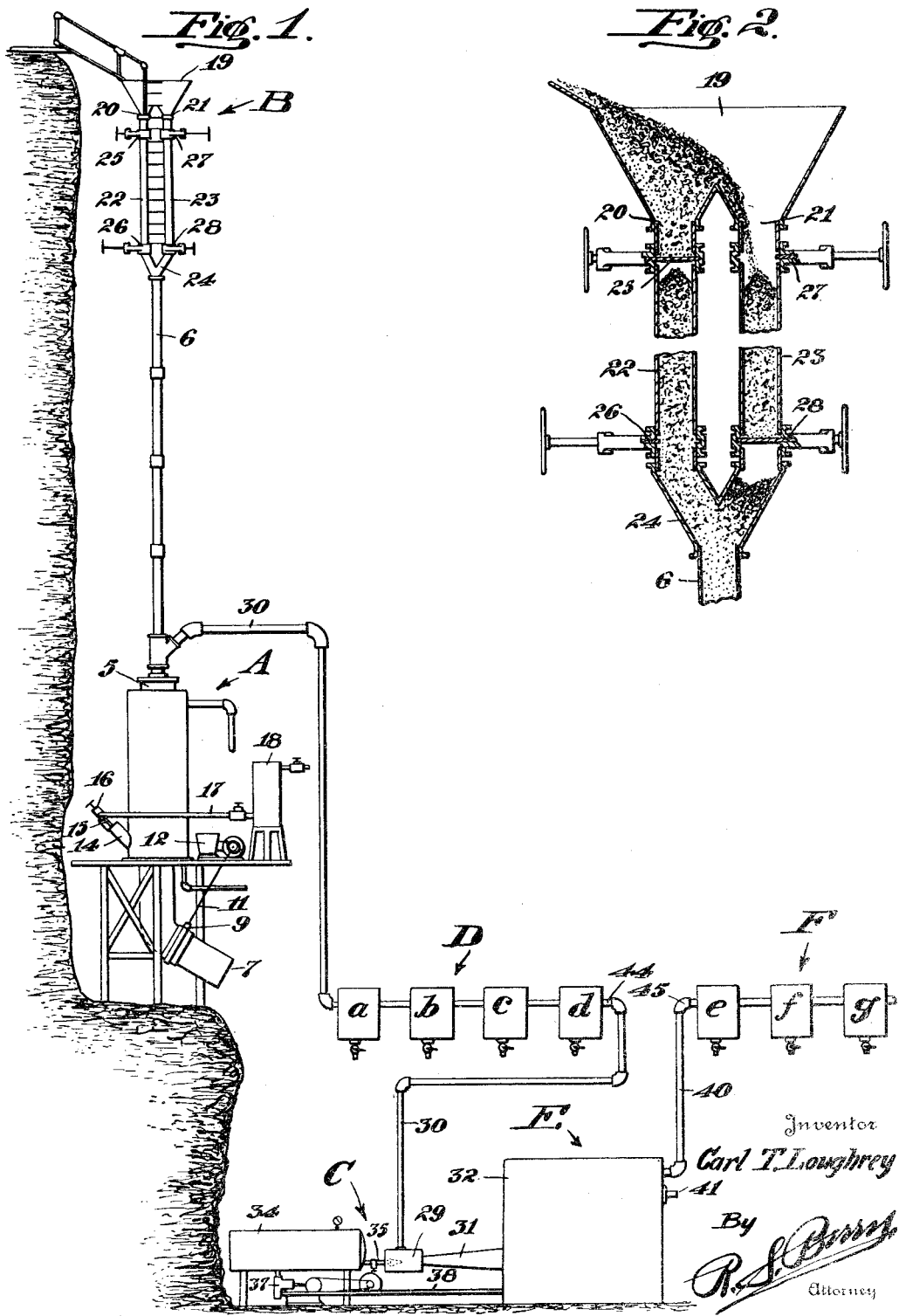

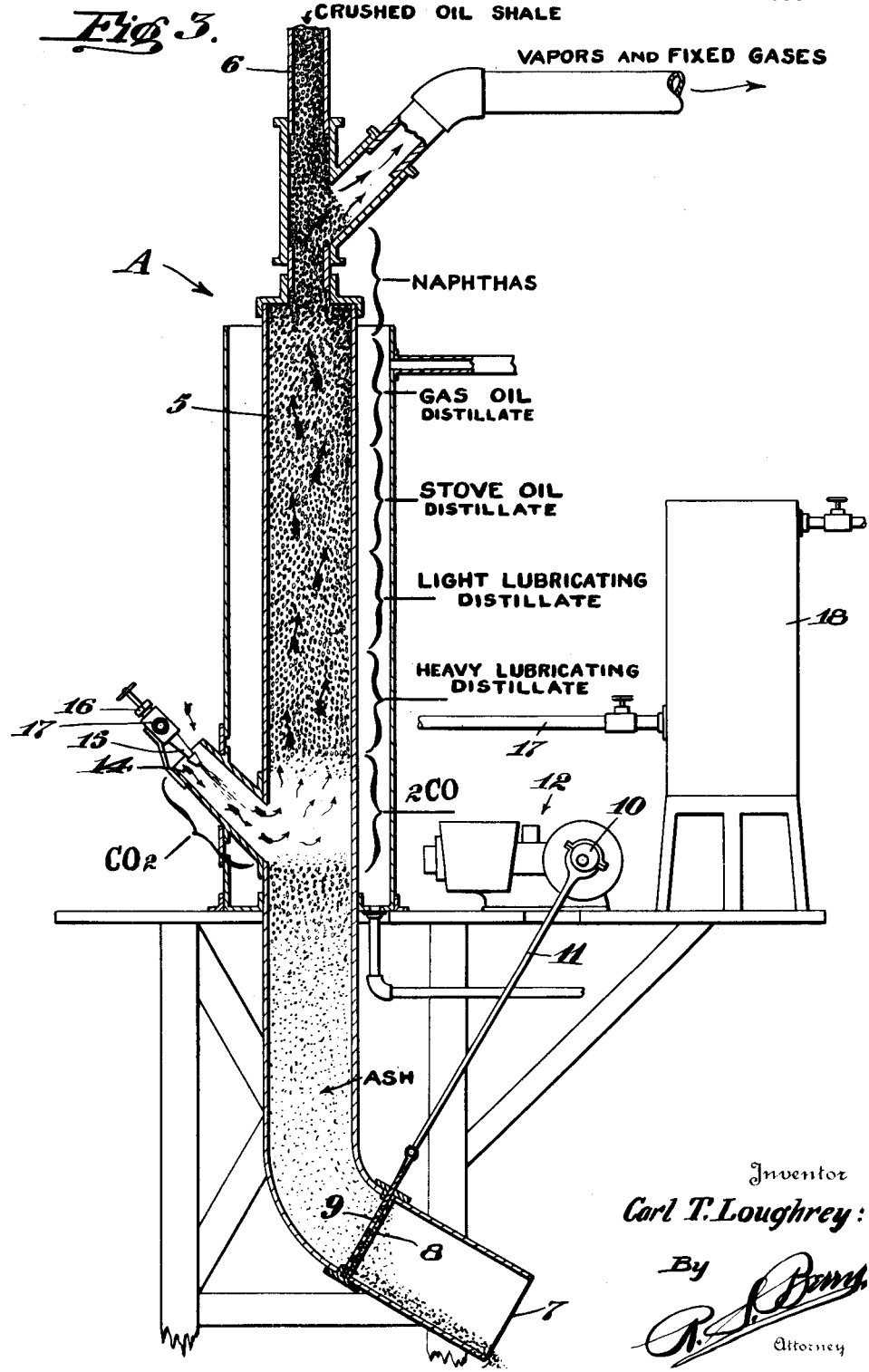

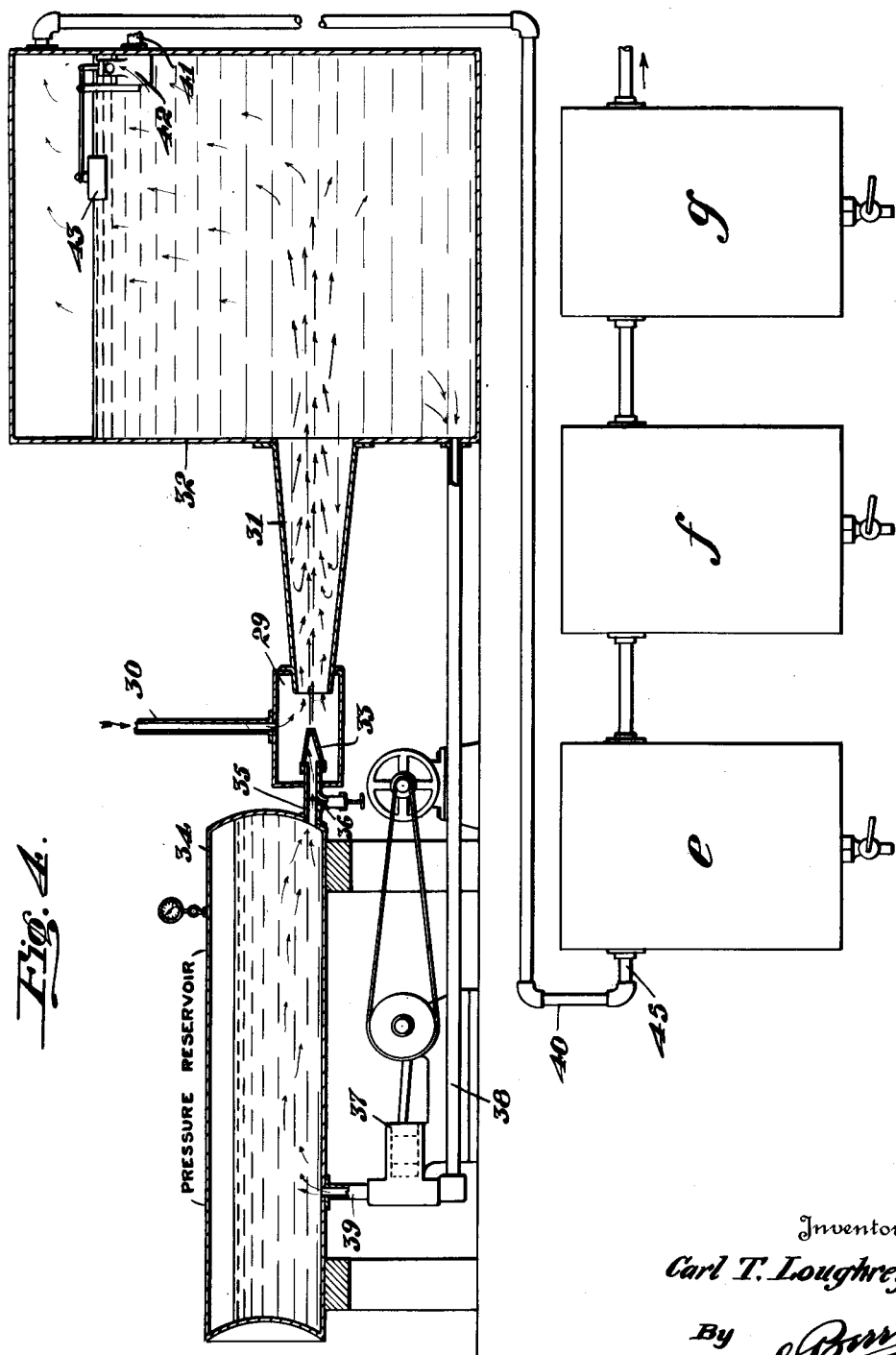

Patented June 7, 1927.

1,631,637

UNITED STATES PATENT OFFICE.

CARL T. LOUGHREY, OF LOS ANGELES, CALIFORNIA.

PROCESS OF DISTILLING OIL SHALE.

Application filed May 5, 1921. Serial No. 467,157.

My invention relates to the extraction of volatiles from bituminous materials, and particularly pertains to a process for distilling oil shale to obtain the volatile constituents therefrom.

It is common practice in removing the volatiles from the matter in which they are incorporated to subject the materials to high temperatures in a sealed retort to effect vaporization of the volatiles. This method while practical for laboratory purposes or on a small scale is not at present adaptable for treating such materials as oil shale to extract the volatiles therefrom for commercial purposes, because the cost of apparatus and the operation in proportion to the value of the output is such as to be unprofitable; it being necessary in order to economically produce the products that the raw materials be rapidly treated in large quantity with little handling at low cost.

An object of my invention is to provide a method whereby a large volume of the substance to be treated may be so subjected to the direct action of heat as to effect a rapid, thorough, and continuous extraction of the oil and volatile constituents therefrom, whereby the products may be obtained in such quantity and at such minimum cost of operation as to render practical the treatment of oil shale and other materials containing volatiles for commercial purposes.

Another object is to provide a method whereby removal of the volatile constituents of a solid may be effected by the application of high temperatured gases directly to the mass and by passing hot products of combustion through a compact column of the materials, whereby a thorough distribution of the hot gases throughout the interstices in the column may be effected without combustion of the removed volatiles.

A further object is to provide a method for removing volatiles from shale in which a limited and controlled combustion zone may be maintained in a column of shale, the shale constantly fed by gravity to the combustion zone and the fixed carbon utilized as fuel, and whereby the products of combustion may be caused to pass from the combustion zone through the interstices in the column above the combustion zone and equally distributed therethrough at an equal pressure of one atmosphere.

With the foregoing objects in view and in contemplation of such other objects as may subsequently appear, I employ an apparatus and certain steps, substantially as hereinafter described and claimed, and illustrated by way of example in the accompanying drawings, in which:

Figure 1 is a view in diagram illustrating an apparatus for carrying out my process.

Figure 2 is a view in vertical section illustrating a feed hopper for effecting a continuous feed of the materials to be treated.

Figure 3 is a view in vertical section showing the manner of subjecting the materials to the action of heat in a vaporizing chamber.

Figure 4 is a diagram of the portion of the apparatus employed for inducing a draft through the vaporizing chamber to remove products of combustion and vapors and for recovering the vapors.

The apparatus for carrying out my invention is here shown in Figure 1 as comprising a combined gas producer and vaporizer A, a charging device B for feeding materials continuously to the gas producer and vaporizer, a combined suction and ejecting device C for creating a partial vacuum in the gas producer and vaporizer to effect an induced draft therethrough and remove gas and vapors therefrom, a series of expansion chambers D for initial condensation of vapors drawn from the gas producer and vaporizer, a liquid condenser E, and a series of final condensers F.

The combined gas producer and vaporizer A shown in Figure 3 is here illustrated as embodying a shaft 5 arranged so that materials delivered thereto may gravitate therethrough and for which purpose it is preferably disposed vertically. The upper end of the shaft connects with a feed pipe 6 through which the materials to be treated are delivered by gravity to the stack from the charging device B; the lower end portion of the stack being turned to extend on an incline and opening at its end 7 to afford a means of discharge of residuum from the stack by gravity. The lower end portion of the stack is preferably provided with a grate 8 and a slide damper 9 arranged adjacent the grate and adapted to be intermittently reciprocated to alternately open and close the grate and thereby regulate the passage of the materials through the stack and the discharge of the residuum therefrom. The grate and damper serve to impede progress of the materials through the stack when the stack is filled and to maintain a compact column of the materials extending throughout the length and breadth of the stack or from wall to wall thereof. The damper is here shown as operated by means of an eccentric 10 which is connected to the damper through a connecting rod 11, and adapted to be operated through a motor 12 of any suitable description. Opening to the stack intermediate its ends is a combustion chamber 14 of suitable dimensions; a single combustion chamber being preferably employed and disposed to open downwardly and at an angle to the vertical center of the stack, as particularly shown in Figure 3, and which combustion chamber is open at its outer end to afford a means of air intake to the stack at atmospheric pressure. The combustion chamber is thus arranged to one side of the stack and to the column or charge of materials therein. A burner nozzle 15 projects into the outer end of the combustion chamber preferably in alignment with the inclined center thereof, which burner is adapted to feed a hydro-carbon fuel or gas, and for which purpose is provided with a regulating valve 16 and is connected to a fuel feed pipe 17 leading from any suitable source of fuel supply here indicated as comprising a reservoir 18.

The charging device B shown in Figure 2 comprises a hopper 19 having twin outlets 20 and 21 connecting with a pair of parallel vertical conduits 22 and 23 terminating at their lower ends in the branches of a Y-connection 24 fitted on the upper end of the feed pipe 6. A pair of dampers 25 and 26 are provided in the conduit 22 adjacent to the ends thereof and a corresponding pair of dampers 27 and 28 are provided in the conduit 23 adjacent its ends, which dampers are designed to be operated to effect a continuous feed of materials from the charging device to the feed pipe and to the stack, which operation is as follows: Either of the lowermost dampers 26 or 28 is closed and the damper thereabove is open while the other lowermost damper is open and the damper thereabove closed, as shown in Figure 2. The material to be treated is delivered to the hopper 19 in a crushed state and will be permitted to accumulate in the conduit 22 or 23 above the closed damper until a suitable quantity of the material is collected, whereupon the two open dampers are closed and the closed dampers are opened so that the charge previously accumulated will be delivered to the feed pipe while another charge is accumulating in the other conduit. This operation is repeated to deliver the charge alternately to the conduits 22 and 23, and thus permits a constant and uniform feed of the material to the stack when the material is being delivered to the feed hopper in sufficient quantity. The dampers also serve to maintain the feed pipe constantly sealed.

The suction and ejection device C shown in Figure 4, embodies a suction chamber 29 to the uper portion of which is connected a suction pipe 30 leading from the feed pipe 6 adjacent to the connection of the latter with the stack; a partial vacuum being formed in the suction chamber as will later be described to effect an induced draft through the combustion chamber 14 and create a suction equally throughout the charge in the portion of the stack above the combustion chamber. Leading from the suction chamber 29 is a discharge passage 31 in the form of a truncated cone, the small end of which opens to the suction chamber and the large end opening to a closed tank 32 adapted to contain a suitable liquid. Extending into the suction chamber 29 is a nozzle 33, which opens directly opposite the center of the passage 31 to discharge liquid into the passage across the suction chamber. The nozzle 33 connects with a pressure reservoir 34 through a pipe 35 fitted with a cutoff valve 36. A plunger pump 37 is provided having an inlet communicating with a feed pipe 38 leading from the tank 32 and having an outlet communicating with the pipe 39 leading to the pressure reservoir. The pump is designed to be operated to maintain a circulation of fluid from the tank through the pressure reservoir 34, nozzle 33, suction chamber 29, passage 31, back into the tank. The throat or passage 31 is gradually enlarged as it approaches the tank in ratio to the expansion of the ingoing stream so as to insure efficient action in inducing a partial vacuum or suction in chamber 29. The passage 31 is sealed by the liquid in the tank.

In the operation of the suction and ejection device, the pump 37 is operated with the valve 36 closed to create a pressure in the reservoir 34, for example about sixty (60) pounds, whereupon the valve 36 is opened and the pump accelerated to effect a discharge of liquid from the nozzle 33 and at the same time maintain a substantially uniform pressure in the reservoir which will serve to insure a practically continuous and uniform discharge through the nozzle 33. The liquid ejected from the nozzle and entering the body of liquid in the tank through the passage 31 serves to create a positive suction in the suction chamber and induce a draft through the stack to draw off the fixed gases and vapors from the stack, as will be later described.

An important feature of the invention resides in the character of the suction induced by the suction and ejection device C which is termed positive suction for the reason that it is nonfluctuating and does not permit any diminution of velocity of flow of the gases. A suction of this character is important for the practical operation of the invention, as it insures a continuous or non-intermittent flow of gases through the charge in the stack and obviates pulsations which would result in back fire or explosions in the charge.

An exhaust pipe 40 connects with the upper portion of the tank 32 above the liquid level therein and passes to any suitable point of discharge. The tank is provided with an overflow pipe 41 fitted with a valve 42 controlled by a float 43; the float and valve serving to maintain a substantially uniform level of liquid in the tank.

The initial condenser D comprises a series of chambers $a$, $b$, $c$, and $d$, spaced apart and connected together in communication with each other by a horizontally extending portion 44 of the suction pipe 30, these condensers being thus disposed between the stack 5 and the vaporizer A and the suction device C so that the fixed gases and vapors drawn from the vaporizer must be subjected to a condensing action before entering the suction chamber 29.

The condenser E comprises the closed tank 32 and the liquid therein through which the gases and vapors are discharged by the ejector C; a portion of the vapors entering the liquid being condensed therein and subsequently automatically delivered from the tank through the overflow outlet 41.

The final condenser F comprises a series of chambers $e$, $f$, and $g$, spaced apart and connected together in communication with each other by a horizontally extending portion 45 of the exhaust pipe 40; these chambers effecting a condensing action on such vapors and gases as may pass through the liquid in the tank 32. Any desired number of these chambers and of the chambers in the initial condenser may be employed as occasion may require.

The apparatus above described is especially adapted for removing the volatiles from oil shale and separating them into various grades according to their specific gravities, and in carrying my method into effect the apparatus is preferably employed and operated as follows: The shale in a crushed state is delivered continuously and in such quantity as to completely fill the stack and form a column or charge in the stack extending in a compact mass from wall to wall and from the grate 8 and damper 9 to a point preferably well above the stack into the feed pipe and above the suction pipe connection. The shale is caused to move downward through the stack by gravity in practically continuous movement; the progress of the material through the stack being slightly impeded by the grate and damper which damper is alternately opened and closed ordinarily at such speed as to permit a subsantially continuous discharge from the lower end of the stack. To maintain a proper charge in the stack such quantity of the materials is fed to the stack as to constantly replace the materials discharged therefrom.

To effect vaporization of the volatile constituents of that portion of the charge in the stack extending above the combustion chamber 14, a suction is induced throughout this portion of the charge by operation of the suction device as before described, and fuel discharged from the burner nozzle 15 is ignited to form hot products of combustion ($CO_2$) in the combustion chamber, which are drawn into the charge at right angles thereto by the suction and caused to pass upward through the descending charge.

Displacement by positive suction is created throughout the interstices in the charge above the combustion chamber forming an equal pressure zone throughout this portion of the charge of less than atmospheric pressure, preferably substantially five (5) inches of vacuum being produced in this zone which is replaced by the products of combustion at atmospheric pressure resulting in equal expansion from wall to wall of the shaft.

Displacement by positive suction is also effected in the combustion chamber which is replaced by air at normal atmospheric pressure entering the open outer end of the chamber, which air supports combustion of the fuel discharged from the burner nozzle and may be of such volume as to support combustion of a portion of the charge in the stack opposite the open inner end of the combustion chamber where the charge contains carbon for combustion. As complete combustion can only take place according to the amount of air taken through the tuyère at the outer end of the combustion chamber by displacement a constant product of combustion may be obtained.

Complete combustion takes place in the combustion chamber to one side of the stack before entering the charge, so that $CO_2$ at a high temperature will enter the charge and produce an incandescent state on all fixed carbon in the immediate zone of entrance into the charge, thus forming an incandescent zone in the charge opposite the combustion chamber.

In some instances sufficient combustibles may be present in the charge to produce the required volume of products of combustion and fixed gases in the incandescent or combustion zone, in which event the burner will only be employed for initial generation of heat to kindle the materials of the charge. In such case the combustion chamber need not be utilized for the generation of products of combustion, but will then serve as a tuyère to admit air by displacement to the combustion and incandescent zone in the charge. In either event only such volume of air will be drawn into the combustion chamber as to create the desired volume of $CO_2$ in the portion of the charge in the immediate zone extending across the stack opposite the combustion chamber, and not sufficient to support combustion to any appreciable extent upward in the stack, thus restricting combustion to a limited zone.

In event there be no carbon in the charge for combustion, complete combustion on all oxygen pulled into the combustion chamber is effected in the latter with hydro-carbons or gases discharged from the burner, forming $CO_2$, which on being pulled through the charge effects vaporization of the volatile constituents with no further molecular action on the volatiles. In this case, combustion taking place remote from the point of liberation of the volatiles and the volatiles being under velocity, no incandescence will take place and accordingly 2CO or monoxide will not result, and, therefore, the gases passing through the charge under this condition will be solely $CO_2$. This result may in some instances be effected even though carbon be present in the charge by delivering the $CO_2$ from the combustion chamber into the charge at a temperature less than that necessary to form 2CO, or by moving the charge with such rapidity through the zone opposite the combustion chamber as to inhibit incandescence of the carbon content, so that 2CO will not form in an appreciable quantity. However, it is desirable where possible to produce the gas CO as a by-product, but it is not essential in the removal of the volatiles.

The hot gas, whether $CO_2$ or 2CO is pulled upwardly through the mass and by reason of the decrease in pressure in the interstices around the particles of the material induced by suction, the hot gas is brought into intimate contact with the particles and will act thereon to liberate the volatile constituents therefrom. The gases in rising through the charge radiate a portion of their heat to the mass in ratio as they ascend so that the incoming charge at the point of discharge of the gases is subjected to the action of the lowest temperature in the stack thereby releasing the highest volatiles at this point. The charge in moving downwardly advances into zones of gradually increasing temperature so that the volatiles are liberated according to their different temperatures of vaporization, for example, in the treatment of oil shale the first vapors to be liberated as the charge enters the heating zones are the naphthas which will be separated from the shale at comparatively low temperature, and as the charge advances into the zones of gradually increasing temperatures gas oil distillate, stove oil distillate, light lubricating distillate, and heavy lubricating distillate will be successively liberated, while heavier petroleums and fixed carbon remaining in the shale entering the incandescent zone adjacent the combustion chamber and will supply carbon for combustion.

The vapors liberated throughout the charge will be drown upward through the stack, together with the gases and will be drawn from the charge into the suction pipe and into the primary condensers D whereupon expansion of the gases in the condensing chambers will effect a cooling action resulting in condensation of a portion of the vapors in each of the successive chambers; the heavier condensate collecting in the first chamber and the lighter grades collecting progressively in the succeeding chambers. The vapors not collected in the primary condenser pass with the fixed gases into the liquid in the condenser E where portions of the vapors are condensed and drawn off as before described; the gases and such vapors as are not condensed in the liquid condenser are ejected into the final condensers F where practically all the vapors not previously condensed will be collected while the gases are exhausted to a suitable point of discharge. The liquids collected in the condensers E and F are drawn off as occasion requires.

In event vapors liberated in the zones of highest temperature in the stack should condense at any point in the charge they will nevertheless be drawn off by the suction induced in the stack; the moisture being subject to being drawn off while the solids remain. The residuum formed by thus treating the shale comprising in most parts shale ash passes on to discharge at the lower end of the stack under pressure of the incoming charge being thus ejected from the stack by gravity.

By employing displacement by positive suction as a means for causing the hot gases to pass through the charge, a uniform and complete distribution of the gases throughout the interstices in the charge will take place and no open or continuous channels will be formed in the mass along which the gas will flow in defined paths, thereby insuring a thorough and rapid action throughout the charge, and by reason of the products of combustion passing through the charge instead of open channels, I am able to control and confine the oxygen to the combustion zone in the immediate vicinity of the combustion chamber.

From the foregoing it will be seen that I have provided a method for extracting the volatile constituents from oil shale consisting in passing the shale in a crushed state through a chamber in a compact mass completely filling the chamber, pulling hot gases through the mass by displacement, whereby the hot gas will act to remove volatiles from the shale, and thereafter separating the volatiles from the gas.

While I have specified my invention as applied to the extraction of volatiles from oil shale, it is equally applicable for use in removing the volatiles from other substances and accordingly I do not limit myself to the particular use set forth, but may apply the method to the extraction of volatiles from such other materials as are susceptible of being treated in the manner set forth.

I claim:

The method of distilling oil shale consisting in moving a column of finely divided oil shale in a downward direction introducing a heating medium into the column of shale to distill the shale, withdrawing the distillation vapors by suction in a direction opposite to the direction of the moving column of shale, directing a liquid under pressure into the withdrawn distillation vapors so as to create said vacuum, collecting the liquid with the absorbed distillation vapors, recirculating said liquid to the point of injection of the liquid into the distillation vapors.

In witness whereof, I have hereunto placed by signature this 26th day of April, 1921.

CARL T. LOUGHREY.